United States Patent [19]

Hong et al.

[11] 4,191,456
[45] Mar. 4, 1980

[54] OPTICAL BLOCK FOR HIGH BRIGHTNESS FULL COLOR VIDEO PROJECTION SYSTEM

[75] Inventors: Byung S. Hong, Mission Viejo; Joseph H. Colles, Oceanside; David D. Scofield, San Diego; Stephen J. Purdy; Stephen J. Reinsch, both of Vista, all of Calif.

[73] Assignee: Hughes Aircraft Company, Culver City, Calif.

[21] Appl. No.: 18,691

[22] Filed: Mar. 8, 1979

[51] Int. Cl.$^2$ .................. H01J 29/89; G03B 21/00; G02F 1/01
[52] U.S. Cl. ................................. 353/31; 350/156; 350/173; 350/342; 353/34; 353/37; 358/61
[58] Field of Search .......................... 353/31, 34, 37; 350/156, 173, 342; 358/56, 61

[56] References Cited

U.S. PATENT DOCUMENTS

| | | | |
|---|---|---|---|
| 3,497,283 | 2/1970 | Law | 350/152 |
| 3,767,290 | 10/1973 | Lang et al. | 350/152 |
| 4,019,807 | 4/1977 | Boswell et al. | 350/342 |
| 4,127,322 | 11/1978 | Jacobson et al. | 353/31 |

Primary Examiner—Steven L. Stephan
Attorney, Agent, or Firm—Elliott N. Kramsky; W. H. MacAllister

[57] ABSTRACT

An improved optical block for use in a high brightness, full color image projection system of the type wherein high intensity (achromatic) projection light is modulated by a full color image composed of a plurality of monochromatic images applied to a plurality of polarization modulating light valves. A polarizer accepts the achromatic, unpolarized output of a high intensity source. Light of a preferred polarization orientation emergent therefrom is directed by the polarizer to a two level array of polarization-sensitive dichroic filters and wavelength-tuned biprisms. Input level dichroic filters separate the incoming unmodulated light into a plurality of component wavelength bands and direct each to a wavelength-tuned biprism. Each biprism directs the selected bandwidth of polarized light to the reflective surface of a light valve. Light reflected therefrom is altered in polarization in the presence of the chromatic component of the full color image and passes to the second or output level of the optical block. Polarization selective dichroic filters in the output level combine the polarization-modulated chromatic components into a high brightness, full color modulated image and direct the image to projection optics.

6 Claims, 4 Drawing Figures

OPTICAL BLOCK FOR HIGH BRIGHTNESS FULL COLOR VIDEO PROJECTION SYSTEM

REFERENCE TO RELATED INVENTION

The present invention is related to U.S. Pat. No. 4,127,322 issued to Jacobson et al on Nov. 28, 1978 for High Brightness Full Color Image Light Valve Projection System. This patent is the property of the assignee of the present invention.

BACKGROUND OF THE INVENTION

1. Field of the Invention

The present invention relates to means for dividing and recombining light from an achromatic light source. In particular, it relates to such means as may be employed to provide an improved optical block for a full color projection system such as that of the above-referenced United States patent.

2. Description of the Prior Art Including Prior Art Statement

An efficient and relatively compact high brightness full color projection system is disclosed in U.S. Pat. No. 4,127,322. That system, which represents a significant improvement over prior art systems discussed therein, modulates a high intensity projection light source with a relatively low intensity primary triad of component CRT images, the sum of which is the full color image to be projected. Polarization modulation is achieved by the reflection of monochromatic light from any one of the three a.c. field effect light valves, each of which is associated with one monochromatic CRT. A single MacNeille biprism is utilized to polarize the incoming projection light while an array of wavelength-selective dichroic filters relays the light to the proper light valve for modulation thereof. Acting as an analyzer, the biprism receives the (modulated) projection light reflected from the three light valves. This light, being polarized along an axis before reflection, will contain an oppositely polarized component which is proportionate to the phosphor intensity of the (appropriate bandwidth) CRT associated with each light valve. The biprism simultaneously reflects the s-polarized component of the reflected (modulated) light to separate projection optics for each of the three (red, green and blue, for instance) full color component bandwidths. The p-polarized component of each passes through the biprism, returning to the light source.

An inherent limitation of the above system results from the known wavelength-dependence of biprism extinction ratio (ratio of the s-polarized, modulated light to the p-polarized unmodulated light being directed to the projection optics). It is desirable that the above-named ratio be as high as possible. For a system of the above-described character, the wavelength dependence of the single analyzer-polarized biprism results in an amount of unmodulated light in the projected image as a wavelength-dependent variation exists in the proportion of modulated (s-polarized) light reflected at each frequency and the proportion of the unmodulated (p-polarized) light not reflected at each frequency.

SUMMARY OF THE INVENTION

It is accordingly an object of the present invention to provide means for improving the performance of a high brightness full color video projection system.

Another object of the present invention is to reduce the chromatic distortion encountered by the use of a single beamsplitter multi-refractive layer to analyze the polarization modulated primary color triad in a high brightness full color video projection system of the type disclosed in U.S. Pat. No. 4,127,322.

Yet another object of the present invention is to achieve the above objects by means of simple optical elements, utilizing relay mirrors to produce a compact optical block.

These and other objects are achieved by the present invention which comprises an improved optical block for use in a full color video projector. A first polarizer multi-refractive layer means is positioned for polarizing a high intensity beam of partially collimated white light to a degree. Input dichroic filter means located on a first or input level separates the white light into three beams of collimated polarized light of different primary colors. Relay mirrors then redirect the three beams in a direction perpendicular to the first plane toward first, second and third wavelength-tuned analyzer multi-refractive layers located on a second level. The wavelength-tuned analyzers further polarize and direct the beams of collimated polarized light to the surfaces of three reflection type polarization state modulation means of the type wherein the state of polarization of the light in said beams is modulated by primary color component video images applied thereto. Each beam is reflected back to one of said wavelength-tuned multi-refractive layers to be analyzed. Finally, output dichroic filter means located in the second level receive the image modulated portion of the polarization-analyzed beams and combine them into a full color image for projection through a single projection lens means.

In another specific aspect of the invention, the input dichroic filter means are designed and coated for one polarization orientation and the output dichroic filter means are coated for a second polarization orientation so as to reflect, in each case, the precise bandwidth selected and to have as high reflectivity as possible to improve the efficiency of the associated high brightness full color video projection system.

These and other objects, advantages and features will be more fully apparent from the following detailed description taken in connection with the accompanying drawings wherein like response characters refer to like parts throughout and in which.

DESCRIPTION OF THE PREFERRED EMBODIMENT

Figure 1:
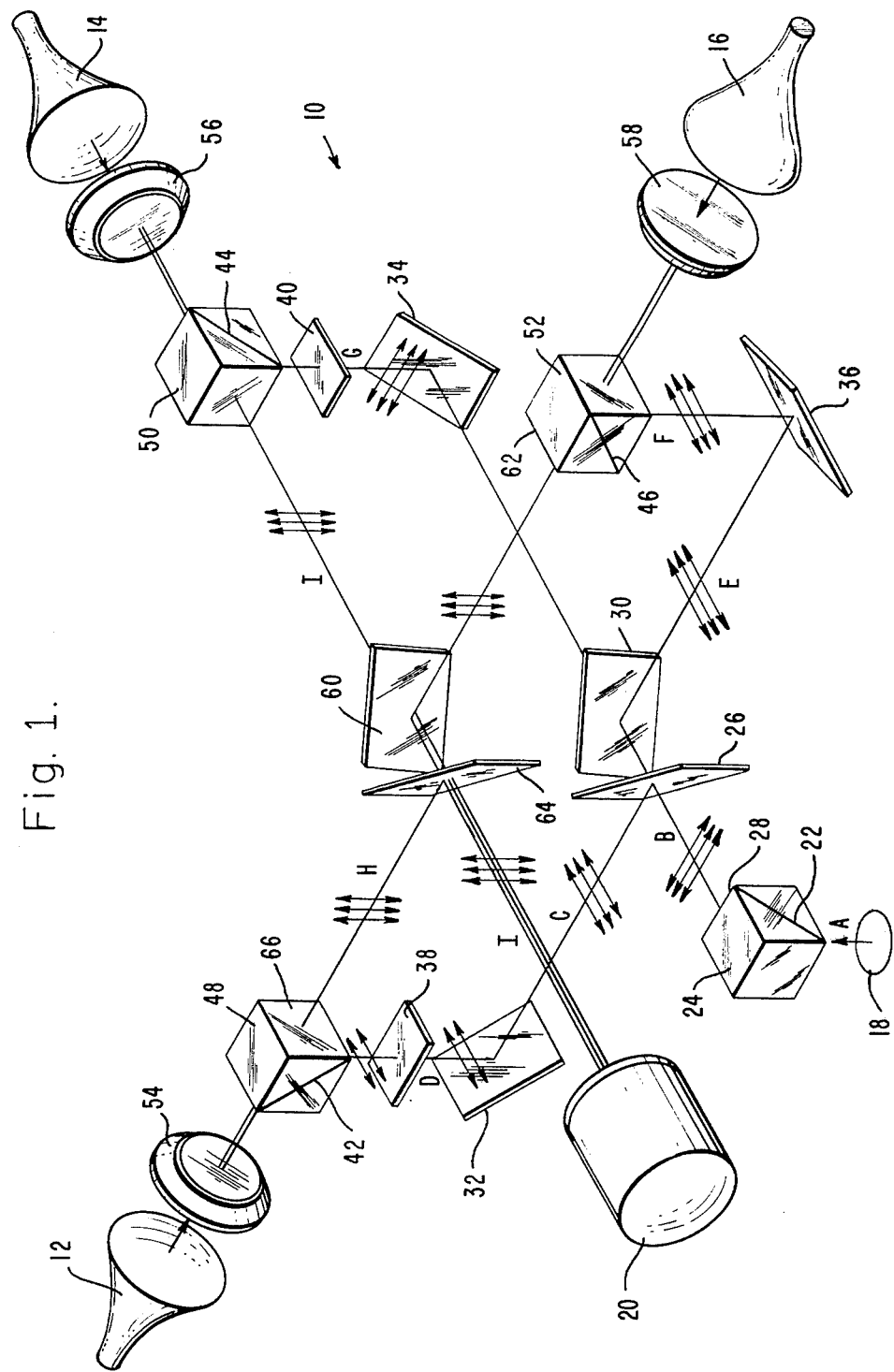
FIG. 1 is a view of the present invention in perspective including the relevant optical paths and polarization orientations.

The improved optical block 10 of the present invention is shown in perspective in FIG. 1. The operational basis of the full color light valve projector follows thusly: a full-color television transmission is decoded and displayed as a component triad on three relatively low-intensity monochromatic cathode ray tubes 12, 14, and 16. (In the illustrated embodiment of FIG. 1, the standard blue, green and red triad is chosen. However other phosphors may be employed provided that their chromatic sum is a full color image.) The monochromatic image on the screen of each CRT is optically coupled by any of a number of standard means such as fiber optic cable, relay lenses or the like to a reflective mode a.c. field effect light valve. Although the organization and operation of such a device will be disclosed in greater detail infra, it will suffice at this point of the discussion to say that such a device acts as a light modulator in the sense that incident polarized light, when reflected from the surface of a light valve, will experience a spatially distributed change of polarization proportional to the phosphor emission (i.e. monochromatic image) on the surface of the CRT to which the light valve is coupled. The optical block 10 serves to polarize, separate and relay the various wavelength or chromatic components of the projection light from a high intensity source 18 to the proper light valve for modulation thereof and then combines the modulated components into the desired high brightness full color image. The full color image may then be projected onto a screen or the like by means of projection optics 20.

The block 10 consists of a two-level array of optical elements which serve as the block's input optics (lower level elements) and output optics (upper level). Certain elements, namely wavelength-tuned biprisms located at the upper level of the block 10, act both as input optics and output optics in the sense that they serve to relay unmodulated light to the system's light valves and thereafter transfer the image modulated portion of light reflected therefrom to the projection optics (lens) of the system.

A high intensity beam of collimated white light is applied to the system by a source 18 which may comprise a combination of elements; for example, a short arc lamp source emitting white unpolarized light containing the entire visible spectrum reflected from a spherical mirror through condensor lenses or the like. The collimated white light produced thereby is applied to a polarizer-beam splitter 22. The polarizer-beam splitter 22 is preferably a polarization selective, light dividing interference coating or multi-refractive layer device of the type described in U.S. Pat. No. 2,403,731 to MacNeille. As disclosed in the MacNeille patent, a plurality of refractive layers of appropriate index of refraction and thickness may be deposited at the interface between the two halves of a glass cube 24 so that the layer forms a 45 degree angle with the intersecting sides of the cube.

A blue dichroic filter 26, the center of which is aligned with the center of the polarizer-beam splitter 22 is oriented approximately 45° to the exit surface 28 of the glass cube 24. Similarly a red dichroic filter 30 is oriented approximately 45° to the surface 28 and perpendicular to the blue dichroic filter 26. Each of the above named filters is coated with a wavelength selective coating and optimized to work with light of the desired bandwidth having a p-polarized orientation. That is, incoming light of the proper wavelength and vibrating in a plane parallel to the plane of incidence of the filter (p oriented) will be reflected more efficiently than may be achieved by means of a non-polarized designed filter. Such a system optimized dichroic filter is a standard item produced by a number of vendors including Optocrome, Inc., of Sunnyvale, Calif.

The centers of relay mirrors 32, 34 and 36, which may be ordinary plane silvered mirrors, lie in an imaginary plane including the centers of the beam splitter 22 and dichroic filters 26, 30. Each relay mirror is oriented approximately 45 degrees to this imaginary plane to redirect light along an optical path perpendicular to that of incidence. The above-named elements which lie in the imaginary (lower) plane, along with (ultra violet removing) blue trim filter 38 and (wavelength purifying) green trim filter 40, each intersecting an optical path perpendicular to the plane, constitute the input optics of the system.

Three polarizer-beamsplitters 42, 44 and 46 are mounted at the interfaces of the two halves of the glass cubes 48, 50 and 52. The cubes are aligned with their input faces perpendicular to the light emergent from the relay mirrors and are so oriented that the beamsplitters 42, 44 and 46 are parallel to relay mirrors 32, 34 and 36 respectively. Each beamsplitter is functionally identical to the polarizer-beamsplitter 24. However the light dividing interference or multirefractive layer of each of the above-named beamsplitters has been so composed as to produce an extremely efficient narrowband polarizer. That is, each beamsplitter is of a type "tuned" to achieve its maximum extinction ratio over a narrow range of wavelengths corresponding to the wavelength channel being modulated. Thus, the beamsplitter 42, aligned with the light valve 54 of the blue CRT 12, is "tuned" to blue wavelengths, the beamsplitter 44, aligned with the light valve 56 of the green CRT 14, is "tuned" to green wavelengths and the beamsplitter 46, aligned with the light valve 58 of the red CRT 16, is "tuned" to red wavelengths. Beamsplitters having the above-stated characteristics are presently manufactured by and commercially available from a number of vendors. The Karl Lambrecht Corporation of Chicago, Ill., for instance, manufactures a series of such biprisms by designation T.F.P.C.-40-R, G, B, etc., wherein the last letter designates the desired color tuning of the biprism.

As will be seen infra, the wavelength-tuned beamsplitters 42, 44 and 46 act as an element of both the input optics and of the output optics of the optical block 10. The remainder of the upper or output optics level of the block consists of a red dichroic filter 60, the center of which is aligned with the center of the red beamsplitter 46, positioned at an angle of approximately 45 degrees with the exit surface 62 of the cube 52, and a blue dichroic filter 64, aligned with the center of the blue beamsplitter 42 and positioned approximately 45 degrees with respect to the exit surface 66.

Both the red dichroic filter 60 and the blue dichroic filter 64 have been designed to have the above mentioned polarization-sensitive coating. Unlike the blue dichroic filter 26 and the red dichroic filter 30 of the input optics, however, these filters are both coated for light having an s-polarization orientation. It will be seen in the discussion to follow that the different polarization orientation for the dichroic filters of the input and output optics reflects the fact that unmodulated projection light within the optical block 10 is p-polarized while image modulated projection light is s-polarized, as seen by the dichroic filters.

A projection lens 20 is aligned with the centers of the red dichroic filter 60, blue dichroic filter 64, beamsplitter 44 and light valve 56. The single or unitary projection lens may be either a single or a compound lens as required by a given system, but in any case all of its components are immediately adjacent to each other and function as a single lens means at one point in the optical path of the system. Each of the light valves 54, 56, and 58 is positioned at an optical path length distance from the lens 20 which is equal to its back focal length, as no other lens is interposed. That is to say, the optical path length from lens 20 to light valve 54 is equal to the path length from lens 20 to light valve 56 which in turn is equal to the path length from lens 20 to light valve 58, each of which is equal to the back focal length of projection lens 20. Thus, the images on all three light valves 54, 56 and 58 will be simultaneously focused by the projection lens 20. Since the light valves are orthogonal to and on the optical axis of the projection lens, registration of the images is simply a matter of registering the three cathode-ray tube rasters. This can be done by simple mechanical or electronic adjustment in a manner well known in the art.

The theory and operation of the liquid crystal light valve is discussed extensively in the above-referenced Jacobson patent and, for purposes of completeness, is incorporated herein. As this element is central to an understanding of the operation of the improved optical block 10 of the present invention, a brief explanation thereof is included herein with reference to FIG. 2 and FIG. 3.

Figure 2:
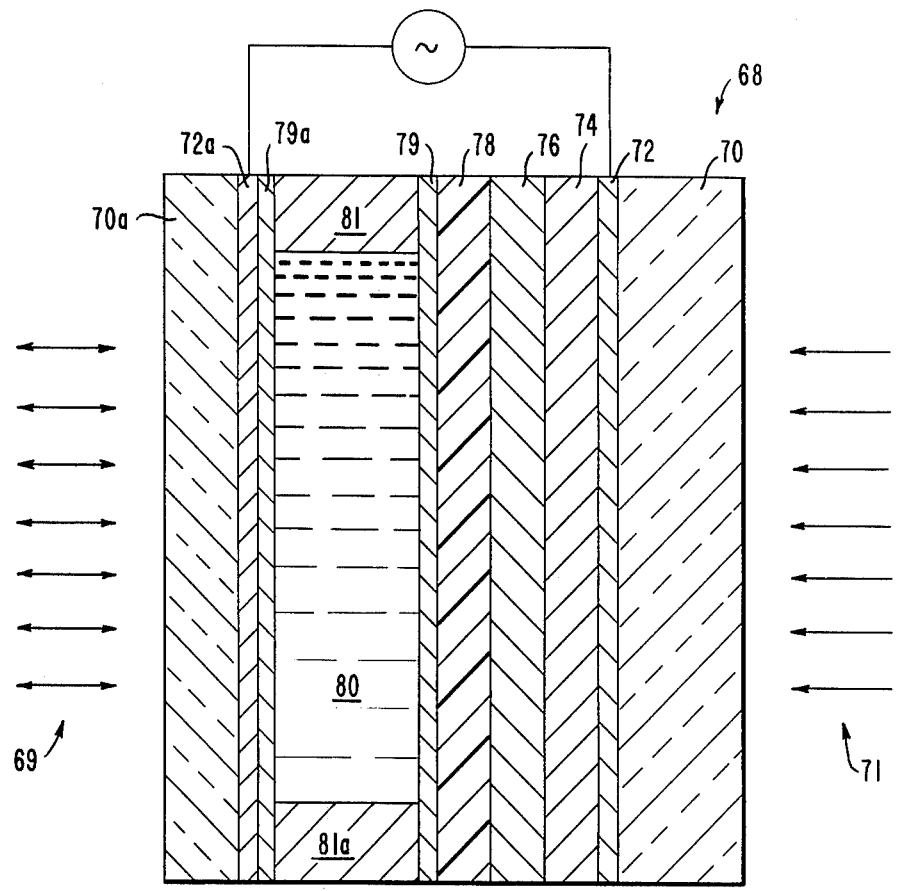
FIG. 2 is a sectional view of an a.c. field effect light valve of the type which may be employed in the present invention.

FIG. 2 shows a generalized cross section of a light valve 68 wherein the projection light 69 is modulated by the image or writing light 71. The device consists of a glass (or other material of optical quality over the spectral band where the photoconductive layer 74 is sensitive) substrate 70 which has a transparent electrode 72 of a thin, transparent conductor such as indium tin oxide deposited thereon. On top of the transparent electrode 72 is a high impedance, thin photoconductive layer 74 fabricated of a material, such as cadmium sulfide, which possesses high sensivity to a low level input image. Other suitable materials include, but are not limited to, zinc sulfide, selenium and zinc telluride as well as complexes thereof. Over this layer there is a thin light blocking layer 76 of cadmium telluride or the like. A multilayer dielectric mirror 78 consisting of alternating quarter wave films of high and low refractive index and a passivating dielectric film 79 that is inert to chemical, electrochemical or mechanical interaction with the liquid crystal being used completes the substrate structure. The use of the high resistance dielectric mirror 78 requires a.c. to operate the device as d.c. voltages are thereby blocked from falling across the liquid crystal material. A thin layer of nematic liquid crystal 80, typically 2 to 4 microns, is sandwiched between the substrate and a counter-electrode consisting of an optically flat glass plate 70a (similar to the substrate 70) and a second transparent electrode 72a. A second passivating dielectric film 79a (similar to the film 79), providing a suitable alignment mechanism is also required. Spacers 81, 81a may be employed to establish the thickness of the layer of liquid crystal 80. Suitable spacers may be of Teflon or sputtered SiO$_2$ or other insulative material such as Mylar having no chemical reaction with the liquid crystal. Connection of an ac bias voltage of from five to fifteen volts at ten to thirty kilohertz prepares the light valve for operation.

Figure 3A:
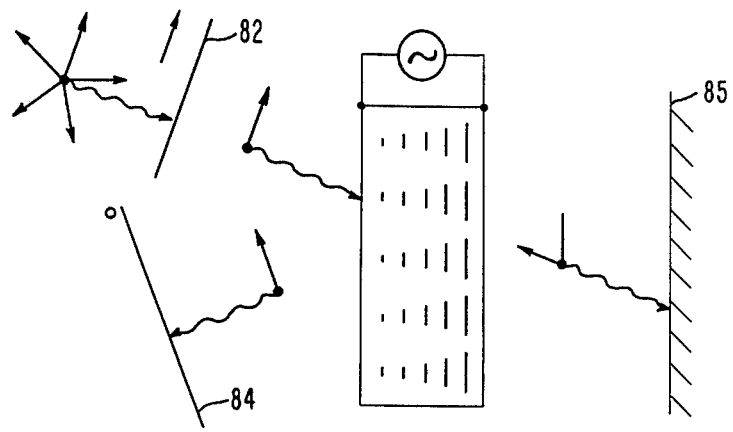
FIGS. 3(a) and 3(b) illustrate the theoretical operation of the light valve of FIG. 2.
Figure 3B:
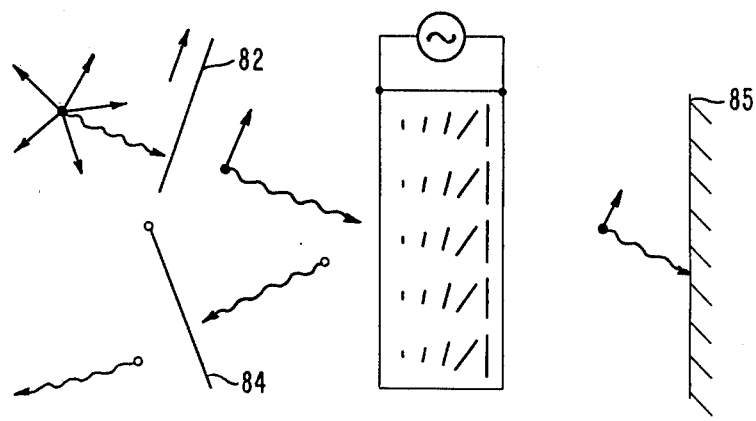

FIG. 3a illustrates the basic OFF-STATE operation of the light valve while its somewhat more complicated ON-STATE operation is shown in FIG. 3b. In FIG. 3a, a polarizer 82 is placed between an illumination source and the light valve while a crossed analyzer 84 is placed in the path of the reflected beam. A dark off-state results from the physical property of the twisted nematic liquid crystal to change the polarization orientation of the incident polarized beam by 45 degrees on a single pass-through. The plane of polarization of the incident beam, having undergone a 45 degree twist of orientation, is then rotated 45 degrees in the opposite direction upon a second pass-through after reflection from the dielectric mirror 85. Thus the polarization vector of the reflected beam is back to the polarization state of the incident light and thereby blocked by the crossed analyzer, producing a black off-state. In application to the optical block 10 of the present invention, the polarizer 82 corresponds to the beamsplitter 22 while the analyzer 84 may correspond to any one of the three color-tuned beamsplitters 42, 44 or 46.

Referring now to FIG. 3b, a voltage above threshold is applied to the liquid crystal as a result of the application of image or writing light to the photosensitive layer of cadmium sulfide or the like of the light valve. As the voltage is applied the liquid crystal molecules begin to tilt toward an alignment perpendicular to the electrode surfaces. The amount of tilt is proportional to the voltage appearing across the liquid crystal.

The reorientation of the formerly parallel molecules of the liquid crystal, due to their birefrigent property (anisotropic indices of refraction), can affect the polarization of the incident light. As a result, the light that emerges from the hybrid field effect light valve is elliptically polarized and that portion which lies in the plane of the analyzer will be transmitted.

Returning now to FIG. 1, the operation of the optical block 10 of the invention may be followed with particular attention given to the optical paths indicated thereon by capital letters. Arrows intersecting the various optical paths indicate the direction of vibration of the polarized light. In operation, a high intensity partially collimated beam of white light containing all visible wave lengths is emitted from the source 18 along the optical path A. The light enters the glass cube 24 and is thereby incident upon the beamsplitter 22 at an angle of approximately 45 degrees. The beamsplitter 22 passes most of the component of the incident white light vibrating in a plane perpendicular to the plane of the beamsplitter 22 (i.e., the p polarization component) and reflects along optical path B most all of the component of the incident light vibrating in a plane parallel to the beamsplitter (i.e., the s-polarization component).

The s-polarized (with respect to the reference of the beamsplitter 22) white light emergent from the polarizing cube 24 is directed along the optical path B toward the blue dichroic filter 26. (The other oriented polarized white light which passed through the cube 24 is no longer within the system.) The s-polarization, with respect to the beamsplitter 22, of the light on optical path B is p polarized light with respect to the orientation of the blue dichroic filter 26. As mentioned supra, the dichroic filters 26, 30 of the input optics are of a type having been coated for p oriented polarized light. It has been found that filters designed specifically for p-polarization function more efficiently in this application.

The blue component of the white light of optical path B is reflected by blue dichroic filter 26 along the perpendicular optical path C. The polarized blue light reflected along the optical path C is redirected by relay mirror 32 along the path D. An ultraviolet and/or a blue trim filter 38, lying in this optical path modifies the light prior to incidence with the blue-tuned beamsplitter 42 mounted at a 45 degree angle to the incoming beam within the glass cube 48. Thus, the polarized blue light, originating from the high intensity source 18, passes through the input optics of one channel of the optical block 10. In like manner, red and green polarized light is applied to the red-tuned beamsplitter 46 and to the green-tuned beamsplitter 44 respectively. Briefly, both the red and green components of the optical path B pass through the blue dichroic 26. The red dichroic 30 is next encountered which is p oriented with respect to the incident light polarization. The p-polarization coating of this filter efficiently separates the red component of the polarized light and directs this along optical path E to the relay mirror 36. The relay mirror 36 directs the polarized red light along the perpendicular path F to the red-tuned beamsplitter 46. The green component of the projection light passes through both dichroic mirrors 26 and 30 and is directed by relay mirror 34 along the optical path G, purified by the green trim filter 40, and applied to the green-tuned beamsplitter 44.

The narrowband, polarized beams of unmodulated light propagating along the optical paths D, F and G are each, mostly, s-polarized with respect to the color-tuned beamsplitter to which it is applied. Most of the propagating light vibrates in the planes of the color-tuned beamsplitters. Hence, substantially all of this light is redirected by each individual color-tuned beamsplitter to its corresponding light valve. Most of the residual p oriented polarized light in the beam is removed by the reflections of the color-tuned beamsplitters.

As described supra, the black or OFF STATE of a light valve effects no change of polarization in the light reflected from the light valve. Hence, if there is no blue component, for instance, of the full color image to be projected, s-polarized blue light will be reflected, unmodified, from the light valve 54. The 45 degree orientation of the beamsplitter 42 will then reflect the s-polarized light back along optical path D where it will be reflected by the relay mirror 32 along path C to the reflecting blue dichroic filter 26. From the dichroic filter 26 it will be directed toward the beamsplitter 22 and back to the source 18.

However, if a blue image component should exist (ON STATE), some of the light reflected from the light valve 54 will have its plane of polarization rotated. Thus, this reflected light will vibrate perpendicular to the plane of the beamsplitter 42. This component, proportional to the intensity of the blue component of the full color image, will pass through the beamsplitter 42 and propagate along the optical path H. This image modulated light is s oriented with respect to the blue dichroic filter 64 of the output optics. As mentioned above, the dichroic filters of the output or upper level of the optical block 10 are coated for an s polarization orientation. Thus, a high reflectivity of the modulated blue projection light is achieved. The 45 degree orientation of the blue dichroic filter 64 with respect to the path H redirects the blue light along the optical path I toward the projection optics 20.

Analyses identical to that performed for projection of the blue image component may be performed for the other components to demonstrate that light from the high intensity source 18 modulated by the image of the green CRT 14 and the red CRT 16 will similarly emerge along the optical path I toward the projection optics 20. As mentioned above, registration of the three images is simplified by the fact that identical optical path lengths exist between the light valves 54, 56, 58 and the unitary projection optics 20. Therefore, the three image modulated components may be summed along the optical path I and projected by the projection optics 20 to form an improved high brightness full color video image on a screen or the like.

Thus, it is seen that there has been added to the full color projection art an improved optical block for use with a projector of the type in which high intensity light is polarization modulated by a triad of relatively low intensity CRT images. The improved optical block achieves additional brightness over the use of a single polarizer-analyzer as is disclosed in U.S. Pat. No. 4,127,322 by means of a unique arrangement of optical elements which associates a separate wavelength-tuned beamsplitter with each of the triad of monochromatic channels that makes up the full color image. The block also employs dichroic filters designed for a particular polarization orientation, thereby improving the reflectivity of the proper wavelength of the polarized light directed thereto to provide an improved high brightness, full color image.

What is claimed is:

1. An improved optical block for use in a high brightness full color video projector of the type wherein a beam of collimated white light from a high intensity source is modulated with the primary color components of at least three video sources by means of a first, second and third reflection type polarization state modulation means, each of said means for spatially modulating a primary color component video image in real time, said optical block comprising:

(a) a first polarizing means positioned to receive said collimated projection light for prepolarizing said light along a first plane and a second plane, said first and second planes being mutually orthogonal and for directing said light polarized along said first plane and said light polarized along said second plane along mutually orthogonal paths;

(b) means for projecting said full color image;

(c) input filter means located on a first level for separating collimated unmodulated polarized white light leaving said first polarizing means into three beams of collimated polarized light of different primary colors;

(d) relay mirror means for redirecting said three beams of collimated polarized light of different primary colors in a direction perpendicular to said first level;

(e) first, second and third wavelength-tuned polarizer/analyzers located on a second level and positioned to receive said three beams of collimated polarized light of different primary colors;

(f) said first, second and third wavelength tuned polarizer/analyzers being arrayed to direct said three beams of collimated polarized light of different primary colors to the surface of said first, second and third reflection type polarization state modulation means so that the state of polarization of the light in said beams is modulated by the primary color component video images and each reflected to one of said wavelength-tuned polarizer/analyzers to be polarization analyzed;

(g) output filter means located on a second level positioned to receive the image modulated portion of said polarization-analyzed beams so as to recombine said three beams into said full color image for projection by said means for projecting said full color image, the optical path length from said means along any of said three primary color beams to the reflection and modulation means for modulating said beam being equal to said path length along any other of said beams and said reflection and modulation means being positioned so that said projection lens means simultaneously images and superimposes the three primary color component images 55 formed separately at each of said reflection and modulation means in said respective collimated light beams to form said full color image without the interposition of any lens in the optical path between said means for projecting said full color image and said reflection and modulation means.

2. An improved optical block as defined in claim 1 additionally characterized in that said input filter means have a first polarization orientation and said output filter means have a second polarization orientation.

3. An improved optical block as defined in claim 2 wherein said means for projecting said full color image comprises a single projection lens.

4. An improved optical block as defined in claim 2 additionally characterized in that said input filter means comprises two dichroic filters which lie along and are oriented 45 degrees with respect to one of the two mutually orthogonal optical paths of the light polarized along a first plane and a second plane by said first polarizing means.

5. An improved optical block as defined in claim 4 additionally characterized in that said output filter means comprises two dichroic filters which lie in and are oriented 45 degrees with respect to an optical path between one of said three wavelength-tuned polarizer/analyzers and said means for projecting said full color image.

6. An improved optical block for use in a high brightness full color video projector of the type wherein a beam of collimated white light from a high intensity source is modulated with the primary color components of at least three video sources by means of a first, second and third reflection type polarization state modulation means, each of said means for spatially modulating a primary color component video image in real time, said optical block comprising:

(a) a first polarizing multi-refractive layer means positioned to receive said collimated projection light for prepolarizing said light along a first plane and a second plane, said first and second planes being mutually orthogonal and for directing said light polarized along said first plane and said light polarized along said second plane along mutually orthogonal paths;

(b) a single projection lens for projecting said full color image;

(c) input dichroic filter means having a first polarization orientation and located on a first level for separating collimated unmodulated polarized white light leaving said first multirefractive layer into three beams of collimated polarized light of different primary colors, said means comprising two dichroic filters which lie along and are oriented 45 degrees with respect to one of the two mutually orthogonal optical paths of the light polarized along a first plane and a second plane by said first polarizing multi-refractive layer;

(d) relay mirror means for redirecting said three beams of collimated polarized light of different primary colors in a direction perpendicular to said first level;

(e) first, second and third wavelength-tuned polarizer/analyzer multi-refractive layers located on a second level and positioned to receive said three beams of collimated polarized light of different primary colors;

(f) said first, second and third wavelength tuned polarizer/analyzer multi-refractive layers being arrayed to direct said three beams of collimated polarized light of different primary colors to the surface of said first, second and third reflection type polarization state modulation means so that the state of polarization of the light in said beams is modulated by the primary color component video images and each reflected to one of said wavelength-tuned multi-refractive layer means to be polarization analyzed;

(g) output dichroic filter means having a second polarization orientation and located on a second level positioned to receive the image modulated portion of said polarization-analyzed beams so as to recombine said three beams into said full color image for projection by said projection lens, said means comprising two dichroic filters which lie in and are oriented 45 degrees with respect to an optical path between one of said three wavelength-tuned multi-refractive layer means and said projection lens, the optical path length from said projection lens along any of said three primary color beams to the reflection and modulation means for modulating said beam being equal to said path length along any other of said beams and said reflection and modulation means being positioned so that said projection lens means simultaneously images and superimposes the three primary color component images formed separately at each of said reflection and modulation means in said respective collimated light beams to form said full color image without the interposition of any other lens in the optical path between said projection lens and said reflection and modulation means.

* * * * *